United States Patent [19]

Michalski, Jr.

[11] Patent Number: 4,567,344

[45] Date of Patent: Jan. 28, 1986

[54] APPARATUS AND METHOD FOR WELDING A STUD TO THE SURFACE OF A WORKPIECE

[76] Inventor: William L. Michalski, Jr., 15 Springdale Ave., Jamestown, N.Y. 14701

[21] Appl. No.: 644,700

[22] Filed: Aug. 27, 1984

[51] Int. Cl.<sup>4</sup> .............................................. B23K 9/20
[52] U.S. Cl. ......................................... 219/98; 219/99
[58] Field of Search .................................... 219/98, 99

[56] References Cited

U.S. PATENT DOCUMENTS

| | | | |
|---|---|---|---|
| 2,442,449 | 6/1948 | Zimmerman | 219/98 |
| 3,059,095 | 10/1962 | Graham | 219/98 |
| 3,940,587 | 2/1976 | Oehry | 219/98 |
| 4,160,148 | 7/1979 | Jenkins | 219/98 |

FOREIGN PATENT DOCUMENTS

| | | | |
|---|---|---|---|
| 2212209 | 7/1974 | France | 219/98 |
| 797462 | 7/1958 | United Kingdom | 219/98 |
| 806526 | 12/1958 | United Kingdom | 219/98 |

Primary Examiner—C. L. Albritton
Assistant Examiner—Catherine M. Sigda
Attorney, Agent, or Firm—Bean, Kauffman & Bean

[57] ABSTRACT

An apparatus for welding studs to a workpiece includes a stud supporting and positioning unit adapted for cooperation with a guide template to provide for accurate positioning of a stud to be welded. The unit includes a centrally located electrode provided with a stud positioning bore and a detent for releasably supporting a stud within such bore; a casing or housing supported on and electrically insulated from the electrode; and a plurality of stud guide pins, which are arranged parallel to the stud positioning bore and supported for axially directed reciprocating movements under the control of spring devices between an extended, guide position and a retracted, stud welding position. The pins cooperate with guide holes provided in the template to accurately locate the stud to be welded. The method involves the mode of forming the template and cooperation of the positioning unit therewith to achieve accurate positioning of a stud.

9 Claims, 9 Drawing Figures

U.S. Patent    Jan. 28, 1986    4,567,344
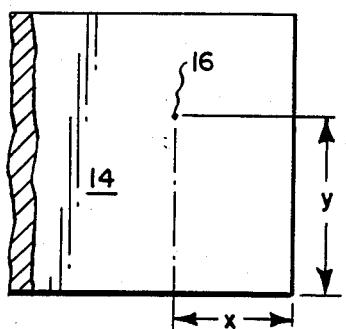
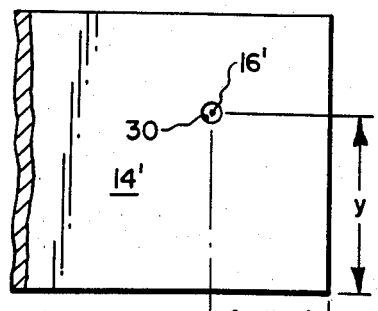
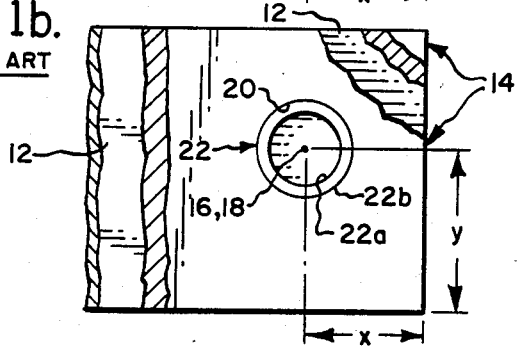
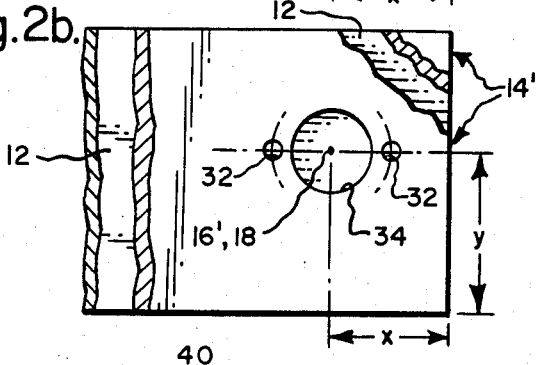
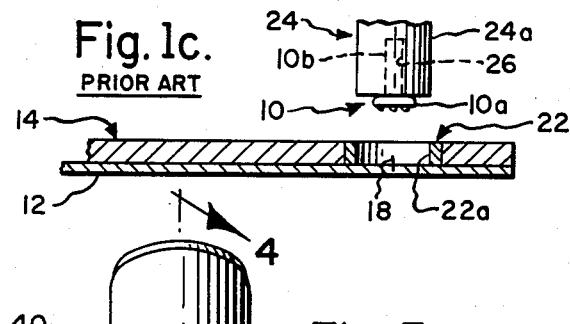
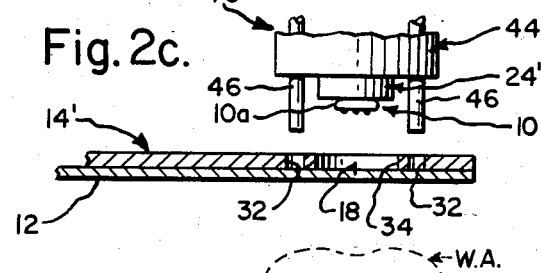
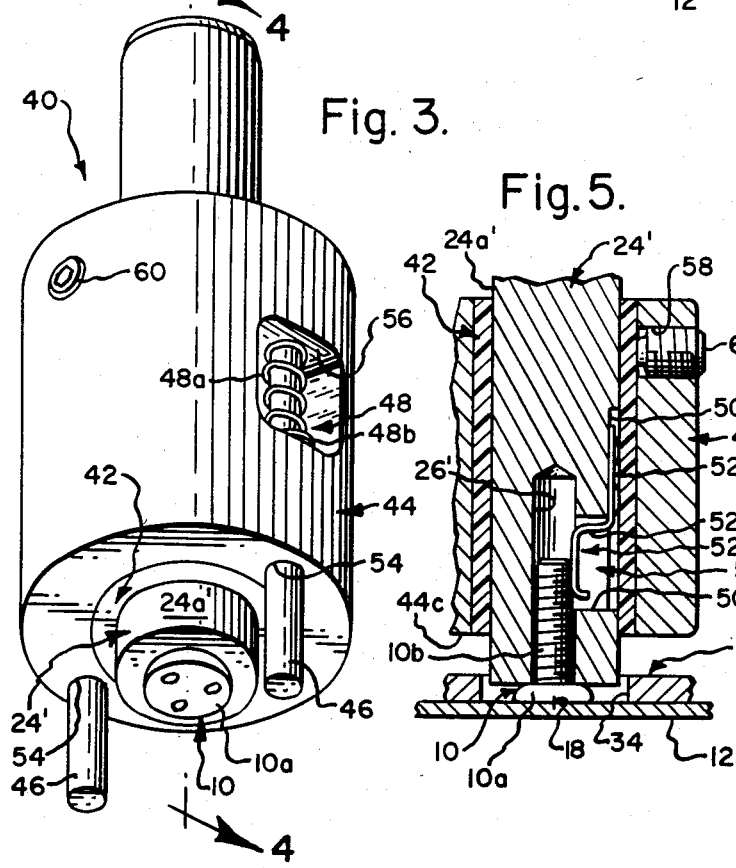

ced as being of the type having a head end portion to be welded to a workpiece surface and an opposite end portion, which is threaded or otherwise adapted for use in supporting a device on the workpiece.

APPARATUS AND METHOD FOR WELDING A STUD TO THE SURFACE OF A WORKPIECE

BACKGROUND OF THE INVENTION

Heretofore, hand operated tools have been provided for use in welding a stud to a workpiece, but an obvious disadvantage of using such tools is the difficulty to insure accurate positioning of a stud where close tolerances are required.

Various numerically controlled welding machines are also available, which provide for accurately controlled positioning of studs. However, machines of this type are normally quite expensive and on this basis not suitable for use in relatively small manufacturing operations or shops.

A simple and relatively inexpensive technique presently in use for achieving accurate positioning of studs involves the use of a template accurately bored to define properly located guide openings for use in controlling the positioning of a stud welding electrode relative to a workpiece. With this technique, it is necessary to glue a non-electrically conductive guide bushing or ring within each of the guide openings to electrically isolate the electrode from the template, during relative movement of the electrode and workpiece between remote stud loading and adjacent stud welding positions. Thus, a drawback of this technique is that wearing away of the guide bushings or rings, occurring as a result of sliding surface engagement thereof with the electrode, eventually introduces inaccuracies in positioning of the studs, where a number of like workpieces are required to be fabricated. A further drawback of practicing this technique is that presently available welding apparatus used therewith, and of which I am aware, employs the force of gravity to retain a stud to be welded in association with the welding electrode. Thus, the workpiece and template must be positioned above the electrode in an inverted condition, such that it is difficult to visually align the guide bushings with the electrode prior to each stud welding operation. An additional drawback involves the thickness of the template and bushing required to provide for proper guiding of the electrode; such thickness being necessarily greater than the axial length of the head end portion of the stud projecting beyond the end of the electrode to provide for guiding of the electrode before such head end bottoms out against the workpiece.

SUMMARY OF THE INVENTION

The present invention relates to an improved, relatively low cost technique for effecting accurate positioning of welded studs and apparatus for carrying out such technique.

The apparatus used in accordance with the present invention includes a stud supporting and positioning unit adapted for cooperation with a guide template to provide for accurate positioning of a stud to be welded to the workpiece. The unit includes a centrally located, electrode provided with a stud positioning bore and a detent for releasably supporting a stud to be welded within such bore; a casing or housing supported on and electrically insulated from the casing; and a plurality of stud guide pins, which are arranged parallel to the stud positioning bore and supported for axially directed reciprocating movements under the control of spring devices between an extended guide position and a retracted, stud welding position. The pins cooperate with guide holes provided in the template to accurately locate the stud to be welded.

The present technique contemplates forming an accurately located pilot hole in a template at each desired stud position, and then using such pilot hole to form at least one pair of guide holes, which are sized to slidably receive the guide pins and arranged to position the axis of stud positioning bore of the electrode, and thus the axis of a stud to be welded, in alignment with the center of the pilot hole when the guide pins are received in the guide holes. The pilot hole is finally enlarged to form a clearance hole of a shape and size sufficient to prevent contact between the stud and/or the electrode with the template, during a welding operation.

During a welding operation, the guide holes are visually aligned with the guide pins, whereafter relative convergent movement between the electrode and workpiece is effected to first position the guide pins within their associated guide holes and then to effect movement of the guide pins into their retracted position, as an incident to which the electrode forces the head end of a stud carried thereby into engagement with the workpiece.

The fitting of the electrode with a detent for retaining studs within its bore allows positioning of the electrode above the template and workpiece and thus greatly facilitates visual alignment of the elements of the present apparatus. An additional advantage of the present apparatus is that the electrode need never be replaced, as a result of wear, and wear may be limited to the disposable templates by forming the guide pins from a material having greater wear resistance than the relatively inexpensive sheet steel or plate used in fabricating such templates. Further, wear is reduced even in templates intended for repeated use, in that the guide pins and template may remain relatively cool, due to the relatively non-conductive thermal barrier and distance between the guide pins and the electrode and the distance between the electrode and those portions of the template bounding the guide holes.

DRAWINGS

The nature and mode of operation of the present invention will now be more fully described in the following detailed description taken with the accompanying drawings wherein:

FIGS. 1a–1c are views generally illustrating steps in performing a presently known stud welding technique;

FIGS. 2a–2c are views generally illustrating steps in performing the stud welding technique of the present invention;

FIG. 3 is a perspective view of a stud supporting and positioning unit of the present invention;

FIG. 4 is a sectional view taken generally along the line 4—4 in FIG. 3, but additionally showing guide pins of the unit placed within guide holes of a template; and FIG. 5 is a sectional view taken generally along the line 5—5 in FIG. 4, but showing a stud weld affixed to a workpiece.

DETAILED DESCRIPTION

Reference is first made to FIGS. 1a–1c, which illustrate successive steps of a welding technique presently in use in small shops and manufacturing facilities for welding commercially available metal studs 10 to a surface of a metal workpiece 12. Studs 10 are available in various sizes and shapes, but may be generally considered as having a head end 10a intended to be welded to the surface of a workpiece such that a shank end 10b upstands therefrom.

In accordance with this prior technique, a template 14 in the form of a steel plate is marked, as by punching, to provide a reference point 16 or center having an accurate x,y position relative to the side edges or other suitable reference means defined by the template, as shown in FIG. 1a, which are intended to be accurately aligned or cooperate with the side edges or other suitable reference means of workpiece 12, such that point 16 may be aligned with a given location or point 18 on the surface of the workpiece with which it is desired to align the axis of stud shank end 10b when head end 10a is weld affixed to the workpiece. Thereafter, a guide opening 20 is punched or bored in template 14 such that its center is aligned or coincident with point 16. A bushing or ring 22, which is formed of a suitable electrically non-conductive and heat resistant material, is then snugly fitted and preferably adhesively bonded within guide opening 20, as shown in FIGS. 1b and 1c. Care is exercised to insure that the inner and outer peripheral surfaces 22a and 22b of bushing 22 are concentric in order to arrange the center of the bushing coincident with the center of guide opening 20, and to insure that inner surface 22a is sized to provide a relatively close sliding fit with an outer cylindrical surface 24a of suitable welding electrode 24 having a concentrically located bore 26, which opens through one end of the electrode and is sized and shaped to slidably receive or support shank end 10b of a stud 10 desired to be welded. Electrode 24 is typically formed of copper and has its opposite end, not shown, suitably configured to facilitate removable mounting of the electrode on known welding apparatus.

In operation of this prior technique, an operator properly aligns and clamps or otherwise temporarily attaches template 14 to workpiece 12 to create an assembly, which is then placed on known welding equipment of which electrode 24 comprises a part; the assembly and electrode being normally inverted relative to their positions shown in FIG. 1c, so as to permit gravity loading of stud 10 into electrode bore 26. Thereafter, the operator moves the assembly, as required to visually align bushing 22 with electrode 24, and then operates the welding apparatus to effect relative vertically directed reciprocating movement of the assembly and the electrode; the insertion of the electrode within the bushing, during the converging movement, serving to insure accurate positioning of stud shank end 10b relative to the workpiece upon welding of its head 10a thereto. It is not deemed necessary to illustrate the specific construction of the welding apparatus used in the practice of this prior technique, since same is well known in the art. However, to facilitate understanding of the welding operation, it is mentioned that such apparatus is typically adapted to generate a low voltage, high amperage welding current and characterized in that a welding circuit is completed between electrode 24 and workpiece 12 upon engagement of stud 10 with the latter.

In accordance with the technique of the present invention generally depicted in FIGS. 2a–2c, template 14' is first punched or alternatively bored to define a pilot hole or opening 30 whose center 16' has a desired x,y position. Pilot hole 30 is then used as a reference to punch or alternatively drill a pair of parallel pin guide or locator holes 32 and 32, such as by use of conventional numerically controlled punching equipment. Template 14' is completed by suitably enlarging pilot hole 30 to define a generally concentrically located clearance hole 34. Guide holes 32 and 32 are intended to cooperate with a stud supporting and positioning unit 40 in the manner to be hereinafter described. If desired, one or more additional pairs of guide holes may be provided in template 14' in association with each center 16', so as to enable an operator to present workpiece 12 to unit 40 from several directions to facilitate welding of studs 10.

Unit 40 is shown in FIGS. 3, 4 and 5 as generally comprising a cylindrically shaped electrode 24'; an insulating device 42; a metal casing or housing 44; a pair of metal, cylindrical guide pins 46 and 46; and a pair of spring devices 48 and 48.

Electrode 24' may be identical in construction to electrode 24 from the standpoint of having one end provided with a bore 26' for slidably receiving shank end 10b of a stud 10, an opposite end shaped to provide for removable mounting thereof on suitable, known welding apparatus shown in part by broken line and designated as W. A. in FIG. 4, and a cylindrical outer surface 24a' disposed concentrically or bore 26'. Electrode 24' differs from prior electrodes of this general design in that it is provided with an axially extending, radially stepped slot 50 having a latching end 50a opening radially through outer surface 24a' and bore 26' and an opposite, shallow mounting end 50b opening only through surface 24a'. Fitted within slot 50 is a resiliently deformable detent 52 preferably fabricated from the same material used in forming electrode 24'. Detent 52 is best shown in FIGS. 4 and 5 as having a latching end 52a arranged within slot end 50a for engagement with stud shank end 10b, and a mounting end 52b fixed within slot end 50b by peening the edges of the electrode bounding slot end 50b, as at 50b'.

Insulating device 42 is preferably in the form of a sleeve formed of a suitable electrically non-conductive and heat resistant material, such as a composite or laminated fiber/plastic material, having concentric inner and outer surfaces 42a and 42b, wherein inner surface 42a is disposed in surface-to-surface engagement with electrode outer surface 24a'.

Casing 44 is preferably of cylindrical design having an inner surface 44a disposed in surface-to-surface engagement with sleeve outer surface 42b, an outer surface 44b and opposite end surfaces 44c and 44d. Casing 44 is provided with a pair of parallel, cylindrical guide passages 54 and 54, which open through its end surfaces 44c and 44d for slidably supporting guide pins 46 and 46; and a pair of cavities or recesses 56 and 56 arranged to communicate one with each of the guide passages intermediate opposite ends thereof, as best shown in FIG. 4. Guide passages 54 and 54 have their axes disposed parallel to the axis of bore 26' and are characterized as having a given spacing and orientation relative to such bore opening, which determines a corresponding given spacing and orientation of guide holes 32 and 32 relative to point 16', and thus location 18 of workpiece 12 when template 14' is properly attached thereto. Normally, the axes of guide passages 54 and 54, and thus the axes of guide pins 46 and 46, would be arranged equidistant from the axis of bore 26' and disposed within a common plane in order to facilitate the forming of guide holes 32 and 32 in successive templates 14' intended to be used with unit 40.

Spring devices 48 and 48 are arranged one within each of cavities 56 and 56 and individually include a coil type spring 48a and a stop 48b. Each stop 48b is suitably fixed to its associated guide pin 46, as by a C-shaped snap retainer 48c fitted within a guide pin recess, not shown, and each spring 48a is disposed concentrically of its associated guide pin and has its opposite ends arranged in engagement with its associated stop 48b and cavity 56. With this arrangement, guide pins 46 and 46 are biased towards their extended guide positions best shown in FIG. 4 as being defined by engagement of stops 48b and 48b with the lower ends of their associated cavities 56 and 56. As will be apparent, it is necessary to axially position electrode 24' and casing 44 such that the projecting lower or guide ends of guide pins 46 and 46 will be disposed outwardly beyond stud head end 10a when the guide pins are in their guide positions and stud shank end 10b is fully seated within bore 26', as shown in FIG. 4.

Sleeve 42 and casing 44 may be removably or permanently fixed to electrode 24', as desired and in any suitable manner. However, as illustrated in the drawings, it is convenient to size sleeve 42 and casing 44 to provide for relatively tight sliding fits between these elements and between the sleeve 42 and electrode 24', and to releasably attach such elements to the electrode by providing attachment means in the form of a radially extending, through threaded opening 58 in casing 44 and a threaded fastener 60. As will be apparent from viewing FIG. 5, the tightening of fastener 60 against sleeve 42 serves to deform the latter into surface clamping engagement with electrode 24'. If desired, a plastic plug, not shown, may be placed within the inner end of opening 58 in order to prevent fastener 60 from cutting into sleeve 42 sufficiently to create an undesired short circuit between electrode 24' and casing 44.

In practicing the present technique, a template 14' is fabricated in the manner mentioned above with at least one pair of guide holes 32 and 32 and a clearance hole 34 provided for each stud 10 to be welded to workpiece 12; the centers 16' associated with these groups of holes being arranged for alignment with the several locations 18 on the workpiece with which the axes of stud shank ends 10b are intended to be aligned upon welding stud head ends 10a to the workpiece. Suitable reference means, such as the side edges or corners of template 14' are employed to locate centers 16' and then cooperate with suitable reference means of workpiece 12 to align such centers with their associated locations 18 when the template and workpiece are subsequently clamped or otherwise temporarily attached together for purposes of performing the stud welding operation. As previously indicated, the guide holes 32 and 32 are sized and arranged relative to centers 16' in a manner determined by the size and arrangement of guide pins 46 and 46 relative to bore opening 26'. As regards clearance opening 34, it is only necessary that same be sized and shaped to avoid contact of template 14' with stud head end 10a and electrode 24', during the welding operation.

The thus formed template 14' is then removably fixed to workpiece 12 and such assembly placed within a known welding apparatus whose stud positioning electrode has been replaced by unit 40 preferably in a manner permitting the unit to overlie template 14' and workpiece 12 to rest on an opposed or plate type electrode, not shown, commonly employed in such apparatus. An operator then places a stud 10 within electrode bore 26', wherein it is removably retained by detent 52; moves the assembly or unit 40 as required to align the lower or guide ends of guide pins 46 and 46 with a pair of guide holes 32 and 32 associated with a first stud welding location; and thereafter operates the welding apparatus to move the assembly and unit 40 relatively towards one another with the guide pins inserted within their appropriate guide holes for positioning the axes of stud shank end 10b in alignment with location 18 and subsequently to place stud head end 10a in engagement with the surface of workpiece 12 for purposes of effecting weld affixing thereof. The previously described extended or guide position of guide pins 46 and 46 is chosen to insure that they bottom out against the lower ends of guide holes 32 and 32, such as are preferably defined by the upper surface of workpiece 12, prior to engagement of stud head end 10a with such surface; the guide pins thereafter undergoing displacement or retracting movements relative to casing 44 against the return bias of springs 48a and 48a until they reach some retracted or stud welding position, such as that shown in broken line in FIG. 4, determined by engagement of the stud head end with the workpiece. Upon completion of the stud welding operation, the assembly and unit 40 are moved apart and such assembly then either removed from the welding apparatus or repositioned relative to the unit. In welding apparatus employing a low voltage, high amperage current, welding of a stud is normally initiated by engagement thereof with the workpiece. In other welding equipment employing a high voltage, low amperage current, welding is ofttimes performed as a separate operator initiated step.

Placement of the guide pins within the guide holes may be facilitated by the slight rounding off of edges adjacent their inlet ends normally occurring as an incident to their punch forming operation and/or by slightly rounding the edges of the lower or guide ends of such guide pins. As a practical matter, insertion of the guide pins may be facilitated by moving the assembly and unit 40 relatively towards one another in a stepwise manner, that is, first effecting converging movement to a degree sufficient to engage the guide pins with template 14' to thereby slightly depress the guide pins against the bias of their associated springs; transversely displacing the assembly until a first of such pins is aligned with and automatically enters or is inserted into its proper guide hole under the bias of its associated spring; pivoting the assembly or the unit around the inserted guide pin until the other guide pin is in turn aligned with its proper guide hole and automatically forced thereinto by its associated spring; and finally completing such converging movement to place the head end of the stud in engagement with the surface of the workpiece.

The present technique possesses numerous practical advantages over the above described prior technique with regard to ease and accuracy of stud placement. Moreover, the present technique allows templates to be formed from plate stock, which is substantially thinner than plate stock employed for fabricating prior templates, which was required to exceed the axial dimension or thickness of the head end of a stud to be welded by an amount sufficient to provide for proper guiding of the electrode. As by way of example, present templates may be satisfactorily fabricated from plate stock having a thickness on the order of 3/32 inch, whereas prior templates are typically required to be fabricated from plate stock having a thickness on the order of ¼ inch or greater depending on the size of stud being welded.

Although only a preferred form of the present invention has been described, it will be appreciated that modifications and variations thereof may occur to those skilled in the art without departing therefrom. In this respect, it is contemplated that the invention is not limited to the use of a pair of guide pins arranged in the manner illustrated in the drawings, since three or more pin arrangements are suitable for use; or to the illustrated external configurations of the casing, insulating sleeve and electrode or the mode of interconnecting same; or to the spacing and orientation of the guide pins relative to the bore of the electrode, so long as the several elements cooperate to provide for positioning the shank end portions of studs in alignment with desired workpiece locations. Moreover, the term "stud" is intended to be generic and include "nuts", as well as to include any weld affixed device, regardless of whether the "head end" thereof is enlarged relative to or shaped differently than the "shank end" thereof. Still further, the term "bore", as used in reference to the stud mounting opening provided in the electrode, is not intended to be limited to cylindrically shaped openings, but rather to include mounting openings of any cross-sectional configuration, depending upon the configuration of the stud to be supported therewithin.

A series of units may be provided to accommodate a series of studs of various sizes and/or configurations. Alternatively, a single unit may be employed with a series of replaceable electrodes whose bores vary in size and/or configuration, as required to accommodate for the studs to be welded to a workpiece.

What is claimed is:

1. A stud supporting and positioning unit for use with welding apparatus and in cooperation with a template having a pair of guide holes arranged adjacent a clearance opening for weld affixing a head end of a stud to a surface of a workpiece such that a shank end of said stud is disposed to upstand from said workpiece at a location defined by said guide holes, said unit including in combination:

a welding electrode having a bore opening through one end of said electrode for removably mounting said shank end of said stud with said head end disposed outwardly beyond said one end of said electrode, said electrode having an opposite end for mounting said unit on said welding apparatus;
   electrical insulating means supported by said electrode;
   a casing supported by said insulating means;
   a pair of guide pins supported by said casing for reciprocating movement along paths of travel arranged parallel to said bore between an extended position and a retracted position, said guide pins having guide ends thereof projecting from said casing which are sized and spaced apart for receipt within said guide holes and arranged relative to said bore to position said one end of said electrode in alignment with said clearance opening when said guide pins are received within said guide holes, said casing is fixed in position axially of said electrode, whereby when said guide pins are in said extended position and said shank end of said stud is fully seated within said bore opening, said guide ends are disposed outwardly beyond said head end of said stud, said retracted position of said guide pins is determined by engagement of said head end of said stud with said surface of said workpiece; and
   spring means for biasing said guide pins toward said extended position.

2. A unit according to claim 1, wherein said unit further includes resilient detent means carried by said electrode for receipt within said bore for releasably retaining said stud within said bore.

3. A unit according to claim 1, wherein said electrode has a cylindrical outer surface disposed concentrically of said bore, said electrical insulating means is a sleeve having its inner surface engaging said outer surface; said casing has a cylindrical inner surface engaging an outer surface of said sleeve and a pair of guide passages arranged parallel to said bore for slidably supporting said guide pins.

4. A unit according to claim 3, wherein said guide passages extend lengthwise through said casing, said casing is formed with a pair of cavities communicating one with each of said guide passages intermediate opposite ends thereof, and said spring means includes a pair of springs arranged one within each of said cavities and a pair of stops arranged one within each of said cavities and fixed to said guide pins, said springs have opposite ends engaging said casing within said cavities and said stops for biasing said guide pins towards said extended position, and said extended position is defined by engagement of said stops with said casing within said cavities.

5. A unit according to claim 3, wherein said casing is formed with a threaded opening extending between said inner surface and an outer surface thereof, and said unit additionally includes a threaded fastener received within said threaded opening for deforming said sleeve into surface clamping engagement with said outer surface of said electrode.

6. A unit according to claim 5, wherein said guide passages extend lengthwise through said casing, said casing is formed with a pair of cavities communicating one with each of said guide passages intermediate opposite ends thereof, and said spring means includes a pair of springs arranged one within each of said cavities and a pair of stops arranged one within each of said cavities and fixed to said guide pins, said springs have opposite ends engaging said casing within said cavities and said stops for biasing said guide pins towards said extended position, said extended position is defined by engagement of said stops with said casing within said cavities, and said unit further includes resilient detent means carried by said electrode for receipt within said bore for releasably retaining said stud within said bore.

7. In a method of weld affixing a head end of a stud to a surface of a workpiece with a shank end of said stud arranged in alignment with a location on said surface of said workpiece, which employs a welding electrode provided with a bore opening for releasably supporting said shank end of said stud and a template removably fixed in engagement with said surface of said workpiece and formed with through openings for permitting passage of said head end of said stud through said template for engagement with said surface of said workpiece and alignment of said shank end of said stud with said location, as said electrode and said workpiece are moved relatively towards one another, the improvement comprising:

supporting a pair of guide pins on said electrode in an electrically non-conductive relationship therewith and with said guide pins arranged parallel to said bore opening and having a given spacing and orientation relative to said bore opening and said shank end of a stud supported therewithin;

forming a pilot hole in said template for alignment with said location;

using said pilot hole as a guide for forming a pair of guide holes sized to slidably receive said guide pins and having a given spacing and orientation relative to said location corresponding to said given spacing and orientation of said guide pins relative to said bore opening;

increasing the size of said pilot hole to define a clearance hole of a size and shape sufficient to prevent contact of said head end of said stud and said electrode with said template when said head end of said stud is passed through said clearance hole for engagement with said surface of said workpiece and said shank end of said stud is disposed in alignment with said location;

removably fixing said template in engagement with said surface of said workpiece to position said guide holes in said given spacing and orientation relative to said location; and inserting said guide pins in said guide holes to constrain said shank end of said stud for alignment with said location incident to moving said electrode and said workpiece relatively towards one another to pass said head end of said stud through said clearance hole for engagement with said surface of said workpiece.

8. A method of weld affixing a head end of a stud to a surface of a workpiece with a shank end of said stud arranged in alignment with a given location on said surface of said workpiece, said method including:

providing a stud welding electrode having a bore opening through one end thereof for removably supporting said shank end of said stud with said head end of said stud disposed adjacent said one end and outwardly thereof, said shank end of said stud having its axis arranged essentially coincident with the axis of said bore when supported therewithin;

axially slidably supporting a pair of guide pins on said electrode in an electrically non-conductive relationship therewith and with said guide pins having axes arranged parallel to said axis of said bore and having a given spacing and orientation relative thereto, axially biasing said guide pins to normally place outer guide ends thereof in a position outwardly of said one end of said electrode beyond said head end of said stud, while permitting retracting movements thereof rearwardly towards said one end of said electrode inwardly of said head end of said stud;

providing a template of plate material having reference means adapted to cooperate with reference means of said workpiece to position a point on said template in alignment with said location when said template is removably fixed in engagement with said surface of said workpiece;

forming a pair of guide holes in said template sized to slidably receive said outer guide ends of said guide pins, wherein centers of said guide holes have a given spacing and orientation relative to said point corresponding to said given spacing and orientation of said axes of said guide pins relative to said axis of said bore;

forming a clearance hole through said template in alignment with said point and of a shape and size sufficient to freely receive in a non-contacting relation said head end of said stud and said one end of said electrode when said outer guide ends of said guide pins are inserted within said guide holes;

removably fixing said template in engagement with said surface while employing said reference means to position said point in alignment with said location;

placing said shank end of said stud within said bore;

moving said one end of said electrode and said surface of said workpiece relatively towards one another to insert said outer guide ends of said guide pins within said guide holes for positioning said axis of said shank end of said stud in alignment with said location and subsequently to place said head end of said stud in engagement with said surface of said workpiece; and weld affixing said head end of said stud to said surface of said workpiece.

9. The method of claim 8, including forming a pilot hole through said template whose center is coincident with said point and using said pilot hole as a guide in forming said guide holes.

* * * * *